(12) United States Patent
Botosan et al.

(10) Patent No.: US 6,205,779 B1
(45) Date of Patent: Mar. 27, 2001

(54) INTEGRAL HUB DRIVEN GEARS

(75) Inventors: Valentin Botosan, Rochester; Thomas D. Nogle, Troy; Berthold Martin, Shelby Township, all of MI (US)

(73) Assignee: DaimlerChrysler Corporation, Auburn Hills, MI (US)

( * ) Notice: Subject to any disclaimer, the term of this patent is extended or adjusted under 35 U.S.C. 154(b) by 0 days.

(21) Appl. No.: 09/282,669

(22) Filed: Mar. 31, 1999

(51) Int. Cl.$^7$ .............................. F16D 33/00; F01C 1/08
(52) U.S. Cl. ............................................ 60/330; 418/196
(58) Field of Search ........................ 60/330, 339, 358; 418/196

(56) References Cited

U.S. PATENT DOCUMENTS

| | | | |
|---|---|---|---|
| 1,912,323 | * 5/1933 | Taylor | 60/330 X |
| 2,067,457 | * 1/1937 | Morgan | 60/330 X |
| 2,416,193 | * 2/1947 | Meyers | 417/203 |
| 2,589,528 | * 3/1952 | Bergsma | 418/196 |
| 3,113,524 | * 12/1963 | Fulton | 418/79 |
| 3,632,240 | * 1/1972 | Dworak | 418/131 |
| 3,692,432 | * 9/1972 | Liang et al. | 417/286 |
| 3,752,010 | 8/1973 | Tipping . | |
| 3,869,224 | * 3/1975 | Brinkman | 417/383 |
| 3,916,727 | 11/1975 | Piret . | |
| 3,926,287 | * 12/1975 | Taylor | 60/330 X |
| 3,953,970 | 5/1976 | Fuehrer et al. . | |
| 4,011,775 | 3/1977 | Ahlen . | |
| 4,037,687 | 7/1977 | Krutz et al. . | |
| 4,096,693 | * 6/1978 | Kawamoto | 60/339 X |
| 4,114,734 | * 9/1978 | Bultmann | 60/330 X |
| 4,265,602 | * 5/1981 | Teruyama | 418/1 |
| 4,376,370 | 3/1983 | Kinugasa et al. . | |
| 4,395,207 | * 7/1983 | Manttari | 418/102 |
| 4,400,147 | * 8/1983 | Springer et al. | 418/206 |
| 4,577,737 | * 3/1986 | Niikura et al. | 192/3.3 X |
| 4,785,682 | 11/1988 | Nishimura et al. . | |
| 4,875,391 | 10/1989 | Leising et al. . | |
| 4,903,548 | 2/1990 | Hayakawa et al. . | |
| 4,916,899 | * 4/1990 | Koyama et al. | 60/358 |
| 4,936,757 | 6/1990 | Kambe et al. . | |
| 5,013,287 | 5/1991 | Hayakawa et al. . | |
| 5,120,283 | 6/1992 | Bogdan . | |
| 5,269,649 | 12/1993 | Kiefer et al. . | |
| 5,392,603 | 2/1995 | Havens et al. . | |
| 5,522,476 | 6/1996 | Holman . | |
| 5,761,959 | 6/1998 | Winter . | |

\* cited by examiner

Primary Examiner—John E. Ryznic
(74) Attorney, Agent, or Firm—Marc Lorelli

(57) ABSTRACT

The present invention provides a fluid pump for an automatic transmission which has at least one driven gear which has a hub portion insertable into the housing of the pump. By using this apparatus, the driven gear needs only to be aligned in one portion of the pump housing. This eliminates the need to align bores in both halves of the pump housing and to align the post section of the driven gears with the bores in the pump housing.

8 Claims, 2 Drawing Sheets

INTEGRAL HUB DRIVEN GEARS

BACKGROUND OF THE INVENTION

I. Technical Field

The present invention relates to a gear pump for an automatic transmission, and more particularly to a gear pump with improved driven gears which reduces manufacturing complexity and eliminates service problems.

II. Discussion

In an automatic transmission, an oil pump is an indispensable element as a source of pressurized oil. The pressurized oil is supplied to a control valve assembly for controlling gear shifting. Commonly, an oil pump comprises a pump housing formed with a circular recess receiving therein pump elements and also includes a pump cover secured to the pump housing to encapsulate the pump elements within the pump housing. The gear pump, itself, generally comprises a drive gear splined to the torque converter input shaft and two driven gears directly engaged to the drive gear. The driven gears are pivotally mounted on pins which are supported by both the pump housing and the pump cover. In operation, rotational energy derived from the torque converter rotates the drive gear which, in turn, rotates the driven gears to cause pressurization of transmission fluid as is known.

Assembly of the above discussed automatic transmission gear pump, however, has some drawbacks. The pins, on which the driven gears are mounted, must be inserted into bores located in the pump housing and pump cover. This requires alignment of each respective bore and the driven gears. Manufacturers, in attempt to achieve this alignment, must maintain tight tolerances in machining the pump housing and cover and must line up the pins with the bores during assembly. This leads to increased manufacturing cost and service problems. The present invention was developed in light of these drawbacks.

SUMMARY OF THE INVENTION

The present invention overcomes the aforementioned drawbacks, among others, by providing a fluid pump for an automatic transmission which has at least one driven gear which has a hub portion insertable into the housing of the pump. By using this apparatus, the driven gear needs only to be aligned in one portion of the pump housing. This eliminates the need to align bores in both halves of the pump housing and to align the post section of the driven gears with the bores in the pump housing.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiments is merely exemplary in nature and is in no way intended to limit the invention, its application, or uses.

Figure 1:
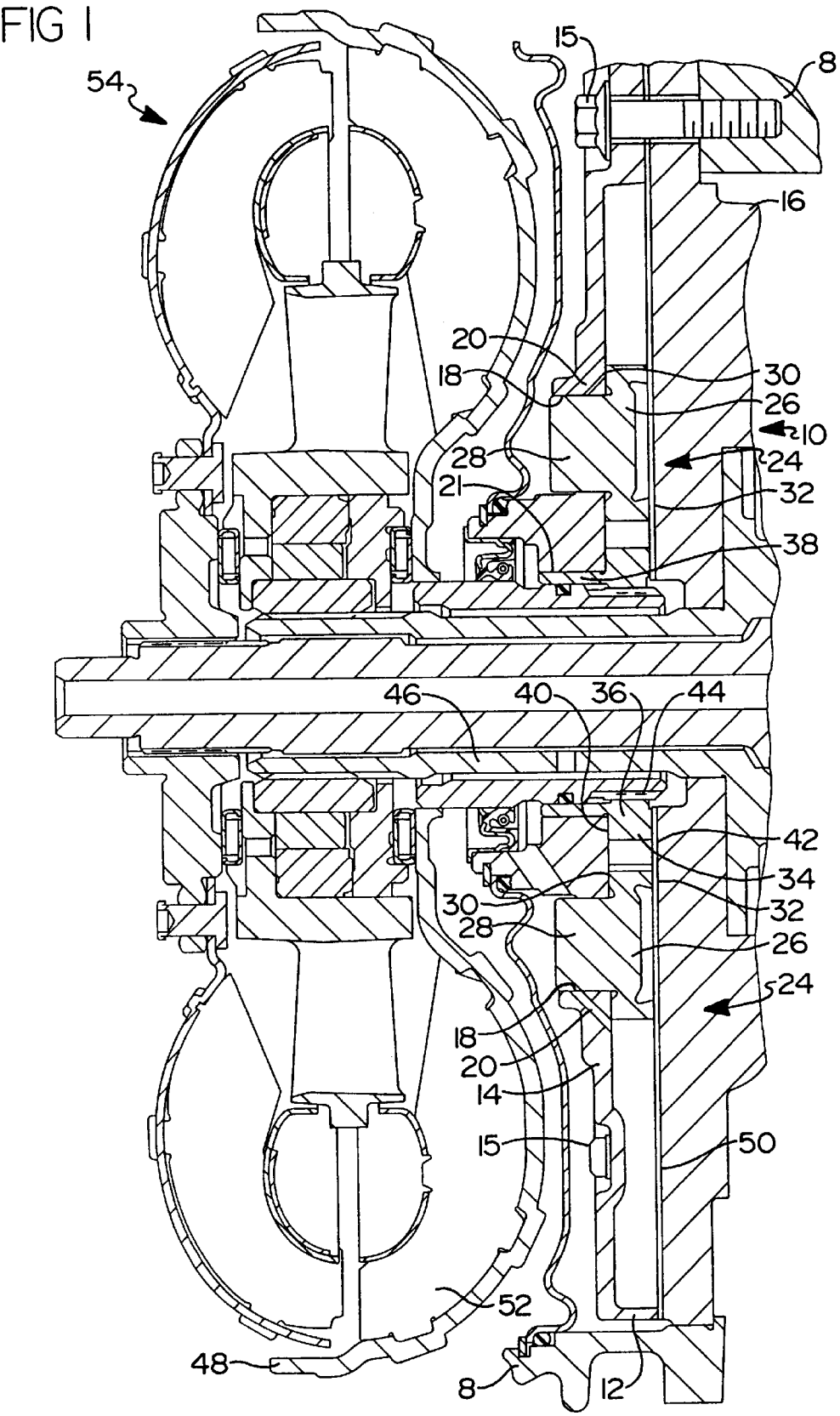
FIG. 1 is a cross sectional view of a transmission according to the present invention.

Referring now to FIG. 1, a transmission pump 10 according to the present invention is shown and described. The transmission pump 10 is located within an automatic transmission 8. Transmission pump 10 has a housing 12, preferably constructed from aluminum or cast iron, which is generally divided into a body portion 14 and a cover portion 16. In between the body portion 14 and cover portion 16 is a separator plate 50. The body portion 14 of housing 12 provides a pair of bores 18 located therein which are adapted to receive hub portions of driven gears (as will be discussed). Bolts 15 maintain body portion 14 and cover portion 16 in a clamped relationship. Bolts 15 also act to connect transmission pump 10 to automatic transmission 8. A lubricating passage 20 fluidly connects each bore 18 with housing 12 to provide lubricant, specifically transmission fluid, into each bore 18. Transmission pump 10 is provided with an entrance port which supplies transmission fluid into housing 12. Likewise, control valves are provided to supply pressurized transmission fluid to the critical components of the automatic transmission.

Positioned within bores 18 are driven gears 24 which generally comprise teeth portion 26 and hub portion 28. Teeth portion 26 comprise shoulder areas 30, positioned flush against body portion 14, and bottom faces 32 which are positioned flush against separator plate 50. Body portion 14 and separator 50 act to maintain each driven gear 24 in a fixed spacial position. Hub portions 28 are placed in sliding engagement with bores 18, allowing each driven gear 24 to freely rotate. The supply of lubricant from lubricating passages 20 facilitates this free rotation and acts to reduce friction between bore 18 and hub portion 28.

Preferably, hub portions 28 are integrally formed with driven gears 24 such that driven gears 24 are constructed from one piece of material such as from a casting or formed by powder metallurgy.

Driver gear 34, similar to driven gears 24, generally comprises teeth area 36 and a hub 38. Teeth area 36 also has a shoulder area 40 and a bottom face 42 for positioning driver gear 34 in a fixed spacial relationship between body portion 14 and separator plate 50. The inner diameter 44 of teeth area 36 of driver gear 34 is splined to sleeve 46. Sleeve 46 is, in turn, affixed to impeller 52 of torque converter 54. From this, it is understood that the input shaft into torque convertor 54, from an automobile engine or the like, drives impeller 52, sleeve 46, and thus driver gear 34.

Figure 2:
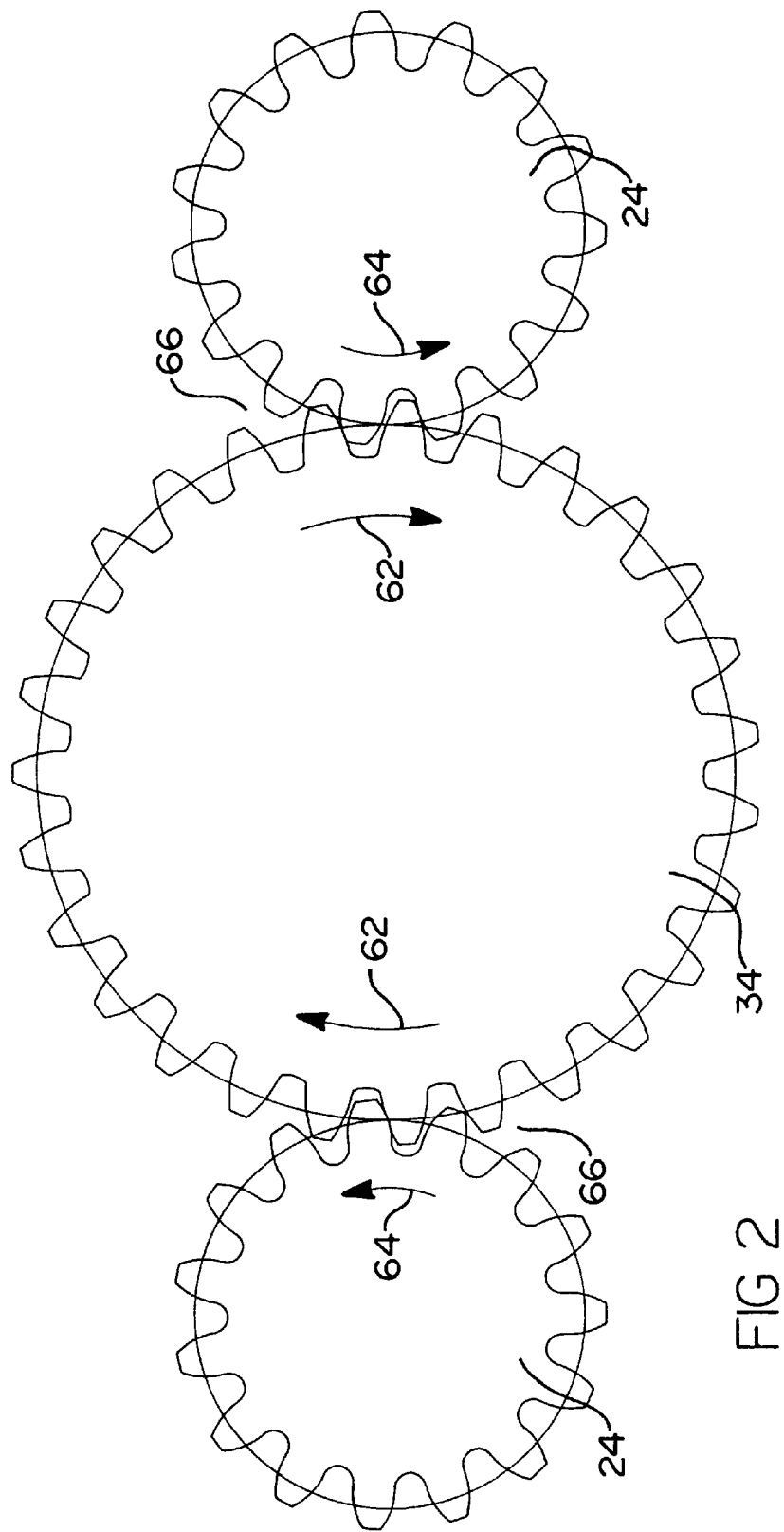
FIG. 2 is a cross sectional view of a transmission pump according to the present invention.

Referring now to FIG. 2, the positioning of driver gear 34 and driven gears 24 can be seen in greater detail. Here, driver gear 34 is positioned in an adjacent and meshed relationship with driven gears 24. Housing 12, as shown in FIG. 1, encapsulates driver gear 34 and driven gears 24. Preferably, driver gear 34 has an outer diameter of 73.27 millimeters, driven gears 24 each have an outer diameter of 42.63 millimeters. Moreover, the distance from shoulder areas 30 to bottom faces 32 of driven gears 24 is preferably 9.6012 millimeters. The addendum and pitch diameter of the driver gear 34 are preferably 2.35 millimeters and 68.58 millimeters respectively.

Referring now to FIG. 1 and FIG. 2, the operation of the present invention is described. To operate transmission pump 10 and supply pressured hydraulic fluid to the critical elements in automatic transmission, driver gear 34 is rotated by sleeve 46 and ultimately by an internal combustion engine in mechanical engagement with impeller 52. Driver gear 34, meshed with driven gears 24, rotates in direction 62 and thereby rotates driven gears 24 in directions 64 as shown (see FIG. 2). Hub portion 28 of driven gears 24 freely rotates in bore 18, lubricated by lubricating passage 20. Similarly, bottom face 32 and shoulder area 30 slide against separator plate 50 and body portion 14 respectively. Hydraulic fluid encapsulated by housing 12 lubricates the interface between these surfaces. The rotating action of driver gear 34 and driven gears 24 cause hydraulic fluid within housing 12 to be pressurized and fed to the critical components of the automatic transmission.

In assembly, the body portion of transmission pump 10 is first machined with bores 18 for driven gears 24 and bore 21 for driver gear 34. Next, driver gear 34 and driven gears 26 are positioned, hub first, into each respective bore. Finally, separator plate 50 and cover portion 16 is attached thereto by bolts 15.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A fluid pump for an automatic transmission comprising:
    a driver gear adapted to receive an input shaft from a torque converter to provide rotational engagement between said torque converter and said driver gear;
    at least one driven gear meshed with said driver gear, said driven gear having a hub portion formed as one piece with said driven gear and extending from a face of said driven gear; and
    a housing encapsulating said driver gear and said driven gear, said housing having at least one bore extending into an internal surface of said housing, said hub portion of said driven gear inserted into said bore thereby rotationally mounting said driven gear in said housing.

2. A fluid pump as claimed in claim 1, wherein said housing comprises a body attached to a separator plate and a cover plate, said separator plate positioned between said body and said cover, said bore being located in said body.

3. A fluid pump as claimed in claim 1, wherein said housing further comprises at least one lubricant passage, said lubricant passage providing fluid communication between said housing and an interface between said hub and said bore, said lubricant passage supplying lubricant from said housing to said interface.

4. A fluid pump as claimed in claim 3, wherein said lubricant supplied to said lubricant passage is pressurized transmission fluid from said housing.

5. A fluid pump as claimed in claim 1, wherein said driver gear is splined to said input shaft of said torque converter.

6. A fluid pump for an automatic transmission in a vehicle, comprising:
    a pump housing having a body portion, a separator plate, and a cover portion, said separator plate being positioned between and flush against said body portion and said cover portion, said body portion having a plurality of bores machined therein and extending into an internal side of said body portion;
    a driver gear; and
    a plurality of driven gears, each of said plurality of driven gears having a hub formed as one piece with said driven gear and extending outward from only one face of each of said plurality of driven gears, each said hub being positioned in a respective one of said bores thereby rotatably mounting each of said plurality, each of said plurality of driven gears meshed with said driver gear.

7. A method of assembling a fluid pump for an automatic transmission, comprising the steps of:
    a. providing a body portion, a separator plate, cover plate, a pair of driven gears and a driver gear, each of said driven gears having a hub formed as one piece with said driven gears and extending outward from a face of each of said driven gears;
    b. machining three adjacent bores in said body portion, each of said bores extending into an internal surface of said body portion;
    c. positioning each of said driven gears in distally located ones of said bores such that each said integral hub rotationally mounts each of said driven gears in said body portion;
    d. rotationally mounting said driver gear in a middle bore of said bores; and
    e. attaching said cover plate to said separator plate and to said body portion, said separator plate being positioned between said body portion and said cover plate.

8. A method as claimed in claim 7, wherein said body portion has at least two lubricant passages, each said lubricant passage supplying lubricant to one of said distally located bores.

* * * * *